Oct. 27, 1959   W. H. EBURN, JR   2,909,977
PHOTOGRAPHIC PRODUCT
Filed Nov. 14, 1957   2 Sheets-Sheet 1
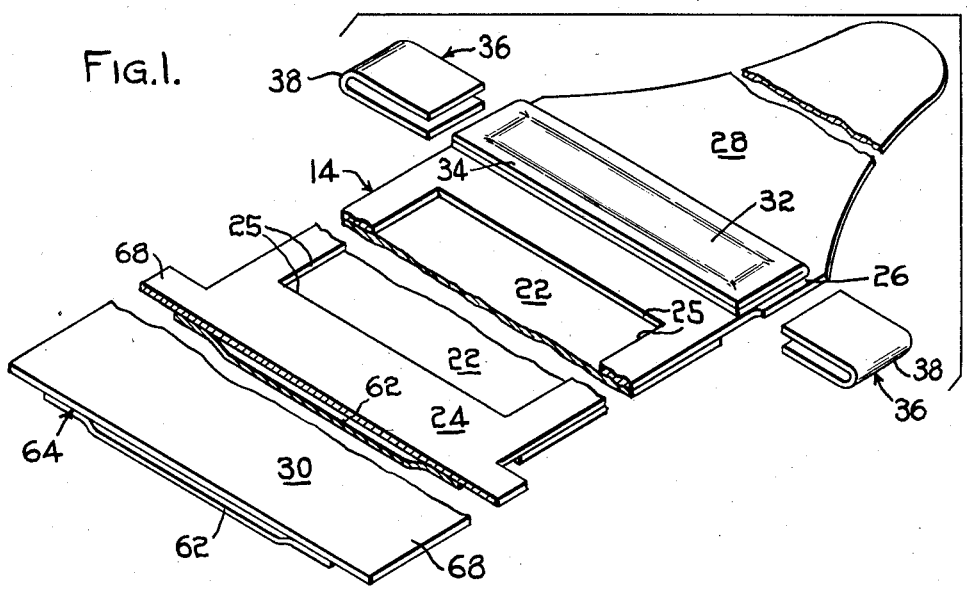
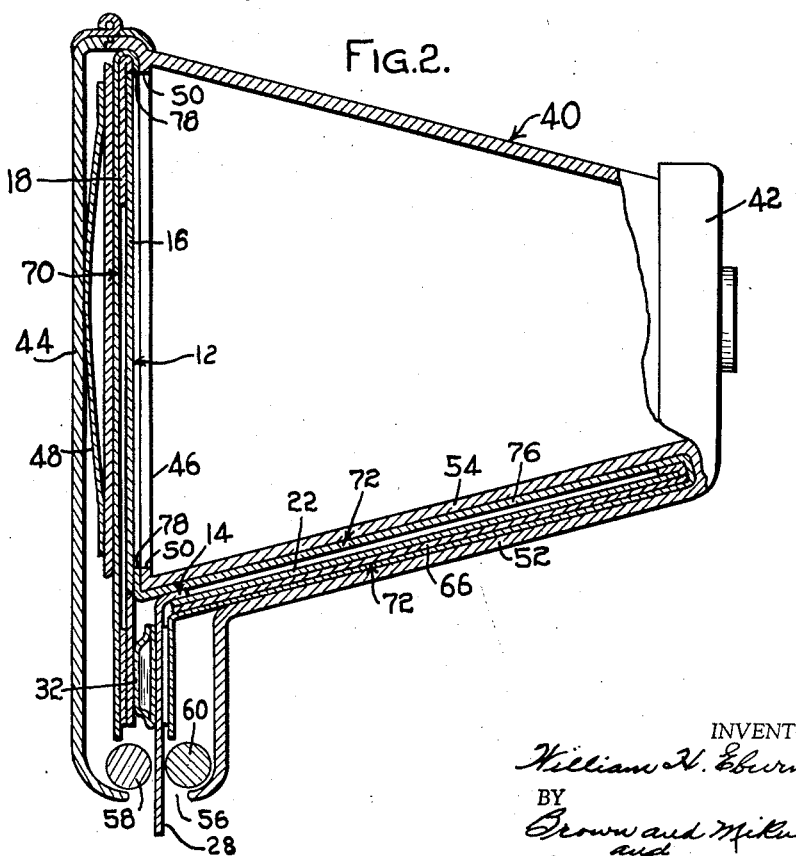

Oct. 27, 1959     W. H. EBURN, JR     2,909,977
PHOTOGRAPHIC PRODUCT
Filed Nov. 14, 1957     2 Sheets-Sheet 2
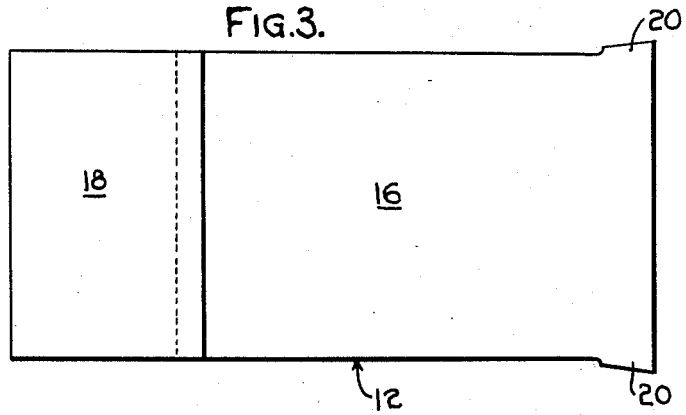
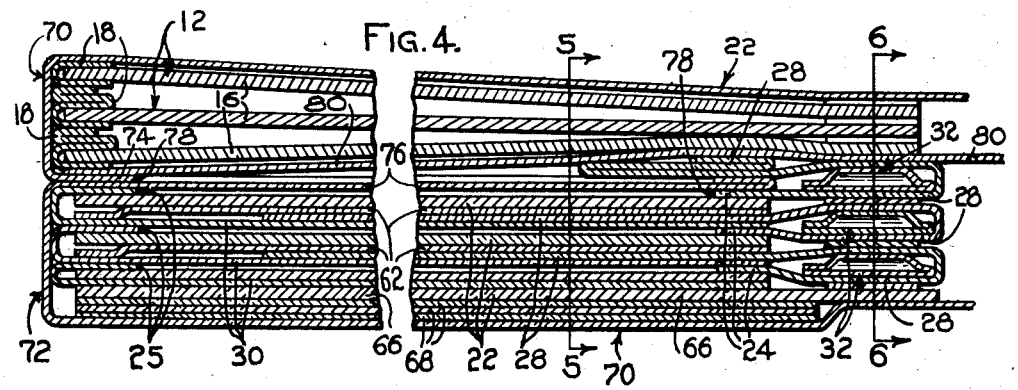
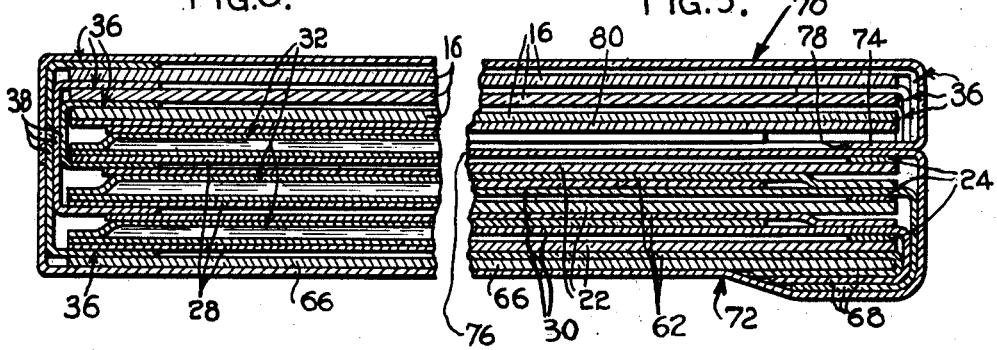
INVENTOR.
William H. Eburn, Jr.
BY
Brown and Mikulka
Robert E. Corb
Attorneys

United States Patent Office 2,909,977
Patented Oct. 27, 1959

2,909,977

PHOTOGRAPHIC PRODUCT

William H. Eburn, Jr., East Weymouth, Mass., assignor to Polaroid Corporation, Cambridge, Mass., a corporation of Delaware Application November 14, 1957, Serial No. 696,505

23 Claims. (Cl. 95—19)

This invention relates to photographic products and, more particularly, to film assemblages adapted to be exposed and thereafter processed in the same apparatus.

In that aspect of the photographic art which has been generally characterized as Land photography and which involves obtaining a picture directly in a camera, certain advantages arise from the use of photosensitive and other sheets in the form of individual units, i.e., in the form of cut film as distinguished from roll film. The camera, in combinations of this type, cooperates with the film units to house one or more film units each of which comprises a photosensitive and a second sheet and for each of which there is provided in the camera a source of fluid processing composition, preferably carried by rupturable containers, which may be mounted on one or another of the sheets of each unit. Means are provided for spreading the fluid processing composition between the photosensitive and other sheets of each unit, preferably after exposure of the former and as the film unit is withdrawn from the camera by suitable tabs or leader means attached to each unit and extending from the camera. Insofar as the actual spreading of the fluid between the sheets is concerned, it is desirable to use a single spreading means in the form of a pair of pressure-applying members for the plurality of units being processed and to have the pressure-applying members of said spreading means perform their function by directly engaging and applying compressive pressure to the sheets between which the fluid is being spread. In systems proposed heretofore, this would require considerable manipulation of the product or apparatus and the leaders attached to the photosensitive and second sheets for threading the leader or leaders attached to each pair of sheets between the pressure-applying members each time a pair of sheets is to be processed in order to have thte pressure-applying members directly engage the sheets of each unit as it is moved between the members and to insure that the leaders of each film unit are properly aligned with one another as they are withdrawn, so that the exposed frame of the photosensitive sheet is registered with a corresponding area of the second sheet. It is by virtue of the present invention that these problems of manipulation and registration are almost entirely eliminated.

The present invention has, as an object, the provision of a film assemblage comprising a plurality of film units each including a photosensitive and second sheet secured together at their leading ends and adapted to be drawn in superposition between a pair of pressure-applying members, following exposure of the photosensitive sheet while spaced apart from the second sheet, and a single leader element attached to the leading end of said film unit.

Another object of the invention is to provide a film assemblage as described wherein the photosensitive and second sheets are arranged in stacked relation with the photosensitive and second sheets comprising each film unit secured together at their leading ends and located between the photosensitive and second sheets of the next succeeding film unit in order of exposure and processing.

Further objects of the invention are: to provide a film assemblage as described wherein the photosensitive and second elements of each film unit are secured together at their lateral margins and said film units are of substantially equal width; to provide, in a film assemblage as described, novel means for retaining successive film units in the assemblage during withdrawal of preceding film units from the assemblage; and to provide a film assemblage comprising a plurality of film units, such as described, wherein the leader of each succeeding film unit is withdrawn, by the preceding film unit, from the assemblage so that the leader can be manually grasped.

Other objects of the invention will in part be obvious and will in part appear hereinafter.

The invention accordingly comprises the product possessing the features, properties and combination of elements which are exemplified in the following detailed disclosure, and the scope of the application of which will be indicated in the claims.

For a fuller understanding of the nature and objects of tthe invention, reference should be had to the following detailed description taken in connection with the accompanying drawings wherein:

Figure 1 is a somewhat schematic, exploded, perspective view, partially in section, of one element of a film unit of the invention;

Fig. 2 is an elevational view, partially in section, of photographic apparatus in the form of a camera for employing the invention;

Fig. 3 is a plan view of another element of the film unit of the invention;

Fig. 4 is a somewhat schematic, sectional view of a film assemblage embodying the invention, the view being taken along a longitudinal plane intermediate the sides of the film assemblage and the thicknesses of the materials comprising the assemblage being exaggerated for clarity of illustration; and Figs. 5 and 6 are partial transverse sectional views of the film assemblage of Fig. 4 taken along the lines 5—5 and 6—6, respectively, of Fig. 4.

Photographic products of the invention generally comprise an assemblage of a plurality of film units, each film unit in turn comprising a photosensitive element, a second or print-receiving element and a leader attached to each film unit. Film units of this type may comprise a photographic film assemblage and may be of a variety of different forms, one of which is shown in Figs. 1 through 6 of the drawings. The drawings show an assemblage of film units with the thicknesses of the materials comprising the assemblage of film units being exaggerated for clarity of illustration. The film assemblage comprises a plurality of units, each comprising a photosensitive element 12 and a second or print-receiving element 14. Both the photosensitive and second elements are in the form of sheets with photosensitive element 12 comprising a photosensitive sheet 16 and a trailer sheet 18 secured to the trailing end of the photosensitive sheet. Photosensitive sheet 16 comprises a layer of a photosensitive material, preferably containing a photosensitive heavy metal shalt, such as silver halide, carried on a suitable support such as paper or one of the organic plastic materials commonly used for film base such as cellulose acetate and the like. Trailer sheet 18 comprises a thin sheet material such as paper which is preferably substantially thinner than the overall thickness of photosensitive sheet 16. Photosensitive sheet 16 is provided with lateral flanges 20 at its leading end which project slightly outward and have lateral edges diverging slightly toward the leading edge of the photosensitive sheet.

Second or print-receiving element 14 comprises a second or print-receiving sheet 22, similar in shape to the photosensitive sheet and at least coextensive with the area or exposure frame thereof which is to be exposed. In the preferred form shown, second sheet 22 is of the same width as, but slightly shorter than, photosensitive sheet 16. Print-receiving sheet 22 is mounted on a leader or carrier sheet 24 which, like trailer sheet 18, is formed of a thin sheet material, such as paper, which is comparatively thin yet strong. The print-receiving sheet is mounted on the side of the carrier sheet opposite the side thereof which is intended to be superposed with the photosensitive element and at a position intermediate the ends of the carrier sheet. Carrier sheet 24 is provided with an aperture 25, preferably rectangular, overlying print-receiving sheet 22 and defining the area thereof in contact with which a fluid processing reagent is spread and in which a transfer print is formed. Second sheet 22 preferably comprises an image-receiving layer carried on a suitable support. The support may be of any suitable sheet material such as paper and organic plastic materials used for photographic films and prints, the choice of material depending on the manner in which the print is to be viewed, i.e., by reflected light or by transmitted light. The image-receiving layer comprises a material layer formed on the support or as a stratum of the support for receiving and/or supporting the transfer image formed of a material produced as a result of development of a latent image in the photosensitive sheet.

Carrier sheet 24 is also provided with a pair of lateral flanges 26 similar to flanges 20 and located adjacent the leading edge of second sheet 22. Carrier sheet 24 includes a leading end section 28 which may be tapered so that it is substantially narrower than the remainder of the carrier sheet and provides a leader for the film unit, of which it is a component, and a trailing end section 30 which, in the form shown, is at least equal in length to second sheet 22.

The photosensitive element, following exposure, is adapted to be superposed with the print-receiving element and the two elements moved in superposition between a pair of pressure-applying members for spreading a fluid processing reagent in a thin layer between the photosensitive and print-receiving sheets of the two elements. In the form shown in the drawings, the fluid processing reagent is provided in a rupturable container 32 attached to carrier sheet 24 on the side thereof opposite second sheet 22 between the superposed sheets adjacent the leading edge of the second sheet. Container 32 is preferably formed of an elongated, rectangular blank of a multilayer sheet material which is impervious to air and to the fluid processing reagent. The blank is folded longitudinally upon itself and the end and longitudinal margins are sealed to one another to form a cavity in which a predetermined quantity of the processing reagent is contained. The longitudinal edge seal of the container is substantially weaker than the two end seals so that the application of compressive pressure to the walls of the container will cause rupture of the longitudinal seal and the unidirectional discharge of the fluid contents of the container. Container 32 is mounted on carrier sheet 24 with the longitudinal sealed portion, designated 34, extending transversely of the carrier sheet and located adjacent the leading edge of aperture 25 and print-receiving sheet 22 so that the application of compressive pressure to the container will cause the discharge of its contents in the direction of the area of sheets 16 and 22 between which said fluid is to be spread. For best results the fluid-carrying cavity of the container should be substantially equal in length to the width of aperture 25 so that the fluid contents of the container will be released therefrom in an elongated mass extending substantially from side to side of the area over which it is to be spread.

The film unit, in one form, may comprise materials for effecting the formation of a positive print by a silver-transfer reversal process, the photosensitive sheet comprising a silver halide emulsion and the fluid processing reagent including a silver halide developer and a silver halide solvent. Processes of this type and materials suitable for use therein for producing transfer prints directly from an exposed photosensitive material are well known in the art and are described in greater detail in United States Patents Nos. 2,543,181, issued February 27, 1951, 2,661,293, issued December 1, 1953, and 2,662,822, issued December 15, 1953 all in the name of Edwin H. Land.

As previously noted the photosensitive element is exposed within the housing of a camera or other apparatus and is thereafter superposed with the second element and the two elements are moved, commencing in the region of their leading ends, between a pair of pressure-applying members for first rupturing the container located between the elements and then for spreading the fluid contents of the container in a layer therebetween to form a sandwich. As this sandwich comprising the photosensitive and second sheets and a layer of fluid processing reagent is formed, it may be moved into a second or processing chamber in which it is maintained in a lighttight environment until processing is complete; or it may be removed from the camera or apparatus directly into the light. In this latter instance, provision must be made for preventing exposure of the photosensitive layer of the photosensitive sheet. This may be accomplished, for example, by providing the supports for photosensitive sheet 16 and second sheet 22 with a material, or with a coating of a material, which is opaque to actinic light. As the fluid processing reagent is distributed between the two sheets, it functions as an adhesive for holding the photosensitive and print-receiving sheets in superposition. Prevention of the exposure of the photosensitive sheet by light entering between the margins of the sheets can be further assured by providing a light-absorbing dye or pigment in the fluid processing reagent.

As previously noted, the film assemblages of the invention comprise a plurality of individual film units, each, in turn, comprising a second element and a photosensitive element adapted to be exposed while positioned apart from the second element. Each film unit comprises a single leader and is processed by being withdrawn with the aid of the leader from the assemblage between a pair of pressure-applying members. The film units of the assemblage are arranged with all the photosensitive sheets in one stack and all the second sheets in a second stack. The photosensitive and print-receiving layers of the photosensitive and second sheets are disposed innermost and it is the innermost film unit which is intended to be exposed and processed first, and the photosensitive and second sheets of subsequent film units are arranged outwardly from the first film unit.

In order that the film units can be withdrawn in succession from the assemblage with the aid of a single leader attached to each film unit, the photosensitive and second elements of each film unit must be secured to one another in such a manner that the photosensitive and second sheets can be positioned apart during exposure, the photosensitive and second sheets are registered with one another when they are superposed and the innermost photosensitive and second elements can be withdrawn from the assemblage between the photosensitive and second elements of subsequent film units. The photosensitive element 12 and second element 14 of each film unit are secured together adjacent the leading ends of photosensitive sheet 16 and second sheet 22 at flanges 20 and 26. For this purpose, there is provided a pair of connecting elements, designated 36 and comprising strips of sheet material secured near the lateral margins of the elements to the outer surfaces of photosensitive sheet 16 and carrier sheet 24. Connecting elements 36 may comprise strips of paper, fabric or plastic material coated with an adhesive, the last-mentioned materials including cellophane tape, "Mylar" tape being particularlly suitable for this purpose.

Flanges 20 and 26 cooperate with the connecting elements when they comprise an adhesive tape by adhering to the adhesive of the connecting elements at the connecting portions 38 thereof which extend between the edges of the photosensitive and second elements to provide means for strengthening the connecting elements in these portions and for preventing the adhesive form adhering to the previous film unit and preventing withdrawal thereof from the assemblage. In one form of the product, the flanges may themselves comprise the connecting elements. In the form shown, however, they perform still another function. By having divergent edges, flanges 20 and 26 cause connecting portions 38 of elements 36 to be spaced outwardly slightly from the edges of the photosensitive and second elements and faciltate movement of each film unit between the connecting elements of the succeeding film units. The divergence of the flanges and the connecting portions further facilitates assembly of the film units between successive film units as well as withdrawal of the film units, one at a time and in proper succession.

In still another form of film unit, second sheet 22 may be equal in length to photosensitive sheet 16 and the two sheets may be secured together at their leading ends by the connecting elements. Leading end section 28 may, in this embodiment, comprise a portion of a carrier sheet for the second sheet (as shown), or section 28 may comprise a separate sheet attached to the leading end of the second sheet.

A typical camera with which the film assemblage of the invention is adapted to be employed is illustrated diagrammatically in Fig. 2 of the drawings along with a film assemblage mounted in the camera. This camera, designated 40, comprises a housing on which is mounted a conventional lens and shutter assembly 42. The housing includes a rear wall 44 and an inner rear wall 46 cooperating to define a rear storage chamber for the photosensitive elements of the assemblage. A spring and pressure plate assembly 48 is provided in the storage chamber for urging the photosensitive elements located therein forward into position for exposure against inner rear wall 46 and an aperture 50 is provided in inner rear wall 46 through which light is transmitted for exposing the photosensitive sheets located in the storage chamber and held against inner rear wall 46. The camera housing includes a lower wall 52 and an inner lower wall 54 extending forwardly at an angle with respect to rear wall 44 and inner rear wall 46 and cooperating to define a second storage chamber in which are contained print-receiving elements 14. A passage 56 is provided at the intersection of the two storage chambers through which the film units can be withdrawn from the camera. The pressure-applying members of the camera are illustrated as a pair of rolls 58 and 60 mounted in juxtaposition in passage 56. Rear wall 44 may be mounted for pivotal movement at its upper end so that the housing can be opened for loading. Roll 58 is preferably mounted on rear wall 44 and roll 60 is mounted on another portion of the housing so that the rolls can be spaced apart to facilitate loading, and particularly for threading a leader between the rolls.

It is desirable that only one leader at a time project from the camera between the pressure-applying rolls and, since there is one leader for each film unit, means are provided comprising each film unit for feeding the leader of the next successive film unit between the rolls and from the camera as each film unit is withdrawn so that the leaders can be grasped. This means comprises a second trailer sheet 62 secured in face-to-face relation to trailing end section 30 along the lateral margins of the second trailer sheet and adjacent the trailing ends of second sheet 22. The trailing end section and trailer sheet are secured together so as to provide an envelope 64 open at the trailing end of second element 14. Envelope 64 is folded back upon the carrier sheet of the second element so as to extend between the second element and the next successive second element. The leading end section 28 of this next successive second element is folded forwardly upon the second sheet so that it projects into envelope 64. Thus, as a film unit is withdrawn from the assemblage between the pressure-applying rolls, envelope 64, containing the leading end section 28 of the next successive film unit, carries the leading end section along with the envelope to provide a leader projecting between the pressure-applying members and connected to the next successive film unit.

As a film unit is withdrawn from the film assemblage, frictional forces are generated between it and succeeding film units, tending to move the succeeding film units. Accordingly, means are provided for retaining the film units stationary during withdrawal of one of them as well as for preventing enevolpe 64 from bunching up and jamming as the film unit of which it is a part is withdrawn. For this reason, the film assemblage is provided with a relatively rigid backing element 66 located on the outside of the stack of second sheets. Trailing end sections 30 are substantially wider than trailer sheets 62, attached thereto, and include lateral side portions 68 which are folded around the lateral margins of backing element 66 and are secured to the rear of the backing element. Suitable means are provided in the camera for engaging and retaining the backing element so that, as a film unit is withdrawn, trailing end section 30 is torn near its margins and adjacent the margins of second trailer sheet 62. Tearing of trailing end section 30 is progressive, commencing adjacent the trailing end of the print-receiving sheet so that envelope 64 cannot buckle or gather and become jammed.

Trailer sheet 18 and envelope 64 perform still another function. It is desirable, in order to insure complete spread of the fluid processing agent in a layer of desired thickness over the area of the photosensitive and second sheets defined by aperture 25, to provide the fluid processing agent in an amount which is greater than that required. It becomes important, therefore, to collect or trap any excess fluid which may be squeezed from between the trailing ends of the photosensitive and second sheets so that this excess fluid does not collect on the pressure-applying rolls. The sheet materials comprising trailer sheet 18, trailing end section 30 and trailer sheet 62 are substantially thinner in aggregate than the combined thickness of the photosensitive and second elements in the region of the second sheet. By virtue of this construction the pressure-applying rolls can be constructed so as to have a minimum gap width which approximates this thickness of the combined photosensitive and second elements, whereby a space is provided between trailer sheet 18 and envelope 64 as they are moved between the pressure-applying members. It is in this space between the trailer sheet and the envelope that any excess processing fluid is trapped and retained. The portions of the intermediate section of carrier sheet 24 bordering aperture 25 and secured to second sheet 22 function as a mask during spreading of the fluid and aid in controlling the thickness of the layer of fluid and the area of contact between the fluid and the print-receiving sheet whereby a border is formed on the transfer print produced on sheet 22.

It is desirable that the film assemblage be as short as possible and for this purpose the trailer sheet 18 of each photosensitive sheet is folded back between the photosensitive sheet and the next succeeding photosensitive sheet. In order to cause the trailer sheet to unfold as the photosensitive element is withdrawn from the assemblage between the pressure-applying members, each trailer sheet 18 is folded first back upon the photosensitive sheet toward the leading end thereof, then back upon itself toward the trailing end of the photosensitive sheet, and then a small end portion is folded upon the previous fold between the latter and the trailing end margin of the next succeeding photosensitive sheet to which it is secured by a strippable adhesive. Trailer sheet 18 is folded three times and secured to the next photosensitive sheet in this manner so that the last fold, which is adhered to the photosensitive sheet, will be peeled therefrom as the element, of which the photosensitive sheet is a part, is withdrawn from the assemblage.

Envelope means are provided for enclosing the film units of the assemblage to protect them, hold them together and prevent exposure of the photosensitive sheets. In the form shown, this means comprises a first envelope 70 for the stack of photosensitive elements 12 and a second envelope 72 for the stack of second elements 14 and backing elements 66. The inner walls of the envelopes, that is, walls designated 74 and 76 and located closest one another, are secured together adjacent the open ends of the envelopes. Inner wall 74 of envelope 70 is provided with an aperture 78 through which photosensitive sheets in the envelope can be exposed. A dark slide in the form of an envelope 80, open at its trailing end and folded back upon itself, is provided in envelope 70 across aperture 78 between inner wall 74 and the first photosensitive sheet for preventing light from entering the aperture. The leading end section 28 of the first film unit is engaged in the dark slide envelope so as to be withdrawn from envelope 70 along with the dark slide. The film assemblage is adapted to be loaded into a camera or other apparatus with first and second envelopes 70 and 72 disposed in separate chambers and with the leading end of dark slide envelope 80 projecting from the camera between the pressure-applying members. The dark slide envelope is then withdrawn from the assemblage (envelope 70), drawing along with it the leading end section 28 of the first film unit to be exposed and processed. As the first and succeeding film units are withdrawn, each carries along with it the leading end section of the next succeeding film unit to provide a leader therefor.

Other modifications may be made in the construction of the film assemblage of the invention and are deemed to fall within the scope thereof. These modifications include, for example, providing a backing element for the photosensitive sheets and securing trailer sheets 18 to the backing element. Other departures from the structure shown include changes in the outer envelope of the assemblage, the dark slide arrangement and the means for retaining the film units stationary during withdrawal of a film unit.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film assemblage comprising, in combination, at least two film units adapted to be exposed and processed in predetermined succession, each film unit comprising a photosensitive element, a second element adapted to be spaced apart from said photosensitive element during exposure of the latter and adapted to be superposed with said photosensitive element during subsequent processing, means securing said photosensitive and second elements together adjacent their leading ends, the last-mentioned means comprising a pair of connecting members extending between the lateral edges of said photosensitive and second elements of each film unit, and leader means extending from the leading end of one of said elements, said film units being arranged with said photosensitive elements located in stacked relation and said second elements located together in stacked relation, the elements of one of said film units being located between the elements of the other of said film units and with the connecting members of said other film unit being disposed outside of the connecting members of said one film unit whereby, following exposure, said one film unit can be withdrawn from the assemblage between the photosensitive and second elements and connecting members of said other film unit.

2. A photographic film assemblage comprising, in combination, at least two film units adapted to be exposed and processed in predetermined succession, each of said film units comprising a photosensitive element, a second element adapted to be spaced apart from said photosensitive element during exposure of the latter and adapted to be superposed with said photosensitive element during subsequent processing, means securing said photosensitive and second elements together adjacent their leading ends, the last-mentioned means comprising connecting members extending between the lateral edges of said photosensitive and second elements of each film unit, and leader means extending from the leading end of one of said elements, at least said one element of one of said film units comprising a trailing member in the form of an envelope extending from the trailing end of the last-mentioned said one element and opened at its trailing end, said film units being arranged with the photosensitive and second elements thereof in stacked relation with the elements of said one film unit located between the elements of the other of said film units and with the connecting member of said other film units disposed outside of the connecting members of said one film unit whereby, following exposure, said one film unit can be withdrawn from the assemblage between the photosensitive and second elements and connecting members of said other film unit, said leader means of said other film unit being engaged in said trailer envelope of said one film unit whereby withdrawal of said one film unit of said assemblage is effective to withdraw the leader means of said other film unit from said assemblage.

3. The photographic film assemblage of claim 2 wherein said one elements are contained within an outer envelope with said trailer envelope disposed between said one element of said one film unit and said one element of said other film unit and is secured at its lateral margins within said outer envelope.

4. A photographic film assemblage comprising, in combination, a plurality of film units adapted to be exposed and processed in predetermined succession, each film unit comprising a photosensitive element, a second element adapted to be spaced apart from said photosensitive element during exposure of the latter and adapted to be superposed with said photosensitive element during subsequent processing, means securing said photosensitive and second elements together adjacent their leading ends, the last-mentioned means comprising a pair of connecting members extending between the lateral edges of said photosensitive and second elements of each film unit, and leader means extending from the leading end of one of said elements, said film units being arranged with said photosensitive elements located together in stacked relation, and said second elements located together in stacked relation, the elements of the first film unit being located innermost and the elements of succeeding film units being arranged outwardly therefrom, the connecting members of each film unit being disposed outside of the connecting member of the preceding film unit whereby, following exposure, said film units can be withdrawn from the assemblage, one at a time, between the photosensitive and second elements and connecting members of succeeding film units.

5. A photographic film assemblage comprising, in combination, a plurality of film units adapted to be exposed and processed in predetermined succession, each of said film units comprising a photosensitive element, a second element adapted to be spaced apart from said photosensitive element during exposure of the latter and adapted to be superposed with said photosensitive element during subsequent processing, means securing said photosensitive and second elements together adjacent their leading ends, the last-mentioned means comprising connecting members extending between the lateral edges of said photosensitive and second elements of each film unit, and leader means extending from the leading end of one of said element, said one element of at least all but the outermost film unit each comprising a trailer member in the form of an envelope extending from the trailing end of said one element and open at its trailing end, said film units being arranged with the photosensitive and second elements thereof in stacked relation with the elements of the first film unit located innermost and the elements of succeeding film units arranged outwardly therefrom and with the connecting members of each film unit disposed outside of the connecting members of the preceding film unit whereby, following exposure, said film units can be withdrawn from said assemblage, one at a time, between the photosensitive and second elements and connecting members of succeeding film units, leader means of each successive film unit being engaged in the envelope of the preceding film unit whereby withdrawal of each film unit from said assemblage is effective to withdraw the leader means of the next succeeding film unit from the assemblage.

6. The photographic film assemblage of claim 5 wherein said one elements are contained within an outer envelope with said trailer envelopes disposed between successive one elements and secured at their lateral margins within said outer envelope.

7. A photographic film assemblage comprising, in combination, a plurality of film units adapted to be exposed and processed in predetermined succession, each film unit comprising a photosensitive element, a second element adapted to be spaced apart from said photosensitive element during exposure of the latter and adapted to be superposed with the photosensitive element during subsequent processing, means securing said photosensitive and second elements together adjacent their leading ends, the last-mentioned means comprising a pair of connecting strips secured to opposite lateral marginal portions of said photosensitive and second elements of each film unit adjacent the leading ends thereof, and leader means extending from the leading end of one of said elements, said film units being arranged with said photosensitive elements located together in stacked relation and said second elements located together in stacked relation with the elements of the first film unit being located innermost and the elements of succeeding film units arranged outwardly therefrom, the connecting members of each film unit being disposed outside of the connecting members of the preceding film unit whereby, following exposure, said film units can be withdrawn from the assemblage, one at a time, between the photosensitive and second elements and connecting members of succeeding film units.

8. A photographic film assemblage comprising, in combination, at least a pair of film units adapted to be exposed and processed in predetermined succession by movement of each film unit, following exposure, between a pair of pressure-applying members, each film unit comprising a photosensitive element, a second element adapted to be spaced apart from said photosensitive element during exposure of the latter and adapted to be superposed with the photosensitive element during subsequent processing, said photosensitive element including a photosensitive sheet and a trailer sheet extending from the trailing end thereof, said second element including a second sheet adapted to be superposed with the photosensitive sheet during processing and a trailer sheet extending from the trailing end of said second sheet, means securing said photosensitive and second elements together adjacent their leading ends, the last-mentioned means comprising connecting members extending between the lateral edges of said photosensitive and second elements of each film unit, and a leader sheet extending from the leading end of one of said elements of each film unit, said film units being arranged with the photosensitive and second elements thereof in stacked relation with the elements of one of said film units located between the elements of the other of said film units and with the connecting members of said other film unit disposed outside of the connecting members of said one film unit whereby, following exposure, said one film unit can be withdrawn from said assemblage between the photosensitive and second elements and connecting members of said other film unit, the leader sheet of said other film unit being engaged with the trailer sheet of said one element of said one film unit whereby the last-mentioned leader sheet is drawn between the pressure-applying members by movement of said one film unit therebetween and provides means whereby said other film unit can be withdrawn from the assemblage between the pressure-applying members.

9. The photographic film assemblage of claim 8 wherein the trailer sheet of said one element of said one film unit comprises two layers defining an envelope open at the trailing end of the last-mentioned one element, said envelope being folded back upon said last-mentioned one element between the latter and the corresponding one element of said other film unit, the leader sheet of the last-mentioned one element of said other film unit being engaged in said envelope.

10. A photographic film assemblage comprising, in combination, a plurality of film units adapted to be exposed and processed in predetermined succession by movement of each film unit, following exposure, between a pair of pressure-applying members, each film unit comprising a photosensitive element, a second element adapted to be spaced apart from said photosensitive element during exposure of the latter and adapted to be superposed with the photosensitive element during subsequent processing, said photosensitive element including a photosensitive sheet and a trailer sheet extending from the trailing end thereof, said second element including a second sheet adapted to be superposed with the photosensitive sheet during processing and a trailer sheet extending from the trailing end of said second sheet, means securing said photosensitive and second elements together adjacent their leading ends, the last-mentioned means comprising connecting members extending between the lateral edges of said photosensitive and second elements of each film unit and a leader sheet extending from the leading end of one of said elements of each film unit, said film units being arranged with the photosensitive and second elements thereof in stacked relation with the elements of the first film unit located innermost and the elements of succeeding film units arranged outwardly therefrom and with the connecting members of each film unit disposed outside of the connecting members of the preceding film unit whereby, following exposure, said film units can be withdrawn from said assemblage, one at a time, between the photosensitive and second elements and connecting members of succeeding film units, the leader sheet of each successive film unit being engaged with the trailer sheet of said one element of the preceding film unit whereby each of said leader sheets is drawn between the pressure-applying members by movement of the preceding film unit therebetween and provides means whereby each successive film unit can be withdrawn from the assemblage between the pressure-applying members.

11. The photographic film assemblage of claim 3 wherein the trailer sheets of said one elements of at least all but the outermost film unit each comprise two layers defining an envelope open at the trailing end of said one element, the trailer sheet is folded back upon said one element between the latter and the corresponding element of the next successive film unit, and the leader sheet of the last-mentioned element is engaged in said envelope.

12. A photographic film assemblage comprising, in combination, at least two film units adapted to be exposed and processed in predetermined succession, each film unit comprising a photosensitive element, a second element adapted to be spaced apart from said photosensitive element during exposure of the latter and adapted to be superposed with said photosensitive element during subsequent processing, said photosensitive element including a photosensitive sheet and a trailer sheet extending from the trailing end thereof, said second element including a second sheet adapted to be superposed with said photosensitive sheet during processing and a trailer sheet extending from the trailing end of said photosensitive sheet, means securing said photosensitive and second elements together adjacent their leading ends, the last-mentioned means comprising connecting members extending between the lateral edges of said photosensitive and second elements of each film unit adjacent the leading ends of said photosensitive and second sheets, and a leader sheet extending from the leading end of one of said elements of each film unit, said film units being arranged with the photosensitive and second elements thereof in stacked relation with the elements of one of said film units located between the elements of the other of said film units and with the connecting members of said other film unit disposed outside of the connecting members of said one film unit, a first envelope containing said photosensitive elements, and a second envelope containing said second elements, said first and second envelopes being joined adjacent said connecting members to provide a single enclosure surrounding said photosensitive and second elements in the region of said connecting members whereby, following exposure, said one film unit can be withdrawn from said assemblage between the photosensitive and second elements and connecting members of said other film unit through said enclosure.

13. A photographic film assemblage as defined in claim 12 comprising a backing element in the envelope containing said one elements and located adjacent said one element of said other film unit, at least said trailer sheet of said one element of said one film unit being secured at its lateral margins to said backing element.

14. The photographic film assemblage of claim 13 wherein the trailer sheet of said one element of said one film unit comprises two layers defining an envelope open at the trailing end of said one film unit, said envelope being folded back upon said one element of said one film unit between the latter and the corresponding element of said other film unit, and the leader sheet of said one element of said other film unit being engaged in said envelope.

15. A photographic film assemblage comprising, in combination, a plurality of film units adapted to be exposed and processed in predetermined succession, each film unit comprising a photosensitive element, a second element adapted to be spaced apart from said photosensitive element during exposure of the latter and adapted to be superposed with the photosensitive element during subsequent processing, said photosensitive element including a photosensitive sheet and a trailer sheet extending from the trailing end thereof, said second element including a second sheet adapted to be superposed with the photosensitive sheet during processing and a trailer sheet extending from the trailing end of said second sheet, means securing said photosensitive and second elements together adjacent their leading ends, the last-mentioned means comprising connecting members extending between the lateral edges of said photosensitive and second elements of each film unit adjacent the leading ends of said photosensitive and second sheets, and a leader sheet extending from the leading end of one of said elements of each film unit, said film units being arranged with the photosensitive and second elements thereof in stacked relation with the elements of the first film unit located innermost and the elements of succeeding film units arranged outwardly therefrom and with the connecting members of each film unit disposed outside of the connecting members of the preceding film unit, a first envelope containing said photosensitive elements, and a second envelope containing said second elements, said first and second envelopes being joined adjacent said connecting members to provide a single enclosure surrounding said photosensitive and second elements in the region of said connecting members whereby, following exposure, said film units can be withdrawn from said assemblage between the photosensitive and second elements and connecting members of succeeding film units through said enclosure.

16. A photographic film assemblage as defined in claim 15 comprising a backing element in the envelope containing said one elements and located adjacent the outermost of said one elements, said trailer sheets of said one elements being secured at their lateral margins to said backing element.

17. The photographic film assemblage of claim 16 wherein the trailer sheets of said one elements of at least all but the outermost film unit each comprises two layers defining an envelope open at the trailing end of said one element, said trailer sheet being folded back upon said one element between the latter and the corresponding element of the next successive film unit, and the leader sheet of the last-mentioned element being engaged in the last-mentioned envelope.

18. A photographic film assemblage comprising, in combination, a plurality of film units adapted to be exposed and processed in predetermined succession by movement of each film unit, following exposure, between a pair of pressure-applying members, each film unit comprising a photosensitive element, a second element adapted to be spaced apart from said photosensitive element during exposure of the latter and adapted to be superposed with the photosensitive element during subsequent processing, said photosensitive element including a photosensitive sheet and a trailer sheet extending from the trailing end thereof, said second element including a second sheet adapted to be superposed with said photosensitive sheet during processing and a trailer sheet extending from the trailing end of said second sheet, means securing said photosensitive and second elements together adjacent the leading ends of said photosensitive and second sheets, the last-mentioned means comprising connecting members extending between the lateral edges of said photosensitive and second elements of each film unit and a leader sheet extending from the leading end of one of said elements of each film unit, said film units being arranged with the photosensitive and second elements thereof in stacked relation and with the elements of the first film unit located innermost and the elements of succeeding film units arranged outwardly therefrom, the connecting members of each film unit being disposed outside the connecting members of the preceding film unit, a first envelope containing said photosensitive elements and a second envelope containing said second elements, the leader sheet of each successive film unit being engaged with the trailer sheet of said one element of the preceding film unit whereby each of said leader sheets is drawn between the pressure-applying members by movement of the preceding film unit therebetween and provides means whereby each successive film unit can be withdrawn from the assemblage between the pressure-applying members, said first and second envelopes being joined to one another adjacent said connecting members to provide a single enclosure surrounding said photosensitive and second elements in the region of said connecting members whereby, following exposure, said film units can be withdrawn from said assemblage through said enclosure.

19. A photographic film assemblage as defined in claim 18 comprising a backing element in the envelope containing said one elements and located adjacent the outermost of said one elements, said trailer sheets of said one elements being secured at their lateral margins to said backing element.

20. The photographic film assemblage of claim 19 wherein the trailer sheets of said one elements of at least all but the outermost film unit each comprises two layers defining an envelope open at the trailing end of said one element, said trailer sheet being folded back upon said one element between the latter and the corresponding element of the next successive film unit, and the leader sheet of the last-mentioned element being engaged in the last-mentioned envelope.

21. A photographic film assemblage comprising, in combination, a plurality of film units adapted to be exposed and processed in predetermined succession, each film unit comprising a photosensitive element, a second element adapted to be spaced apart from said photosensitive element during exposure of the latter and adapted to be superposed with said photosensitive element during subsequent processing, means securing said photosensitive and second elements together adjacent their leading ends, the last-mentioned means comprising a pair of connecting strips secured to opposite lateral marginal portions of said photosensitive and second elements of each film unit adjacent the leading ends thereof, and leader means extending from the leading end of one of said elements, said film units being arranged with the photosensitive and second elements thereof in stacked relation with the elements of the first film unit located innermost and the elements of succeeding film units arranged outwardly therefrom and with the connecting strips of each film unit disposed outside of the connecting strips of the preceding film unit, a first envelope containing said photosensitive elements, and a second envelope containing said second elements, said first and second envelopes being joined to one another in the region of said connecting strips to provide a single enclosure surrounding said photosensitive and second elements in the region of said connecting strips whereby, following exposure, said film units can be withdrawn from said assemblage between the photosensitive and second elements and connecting strips of succeeding film units through said enclosure.

22. The photographic film assemblage of claim 21 wherein said first and second envelopes include outer walls and inner walls disposed adjacent one another at which said envelopes are connected to one another, said inner wall of said first envelope being provided with an aperture through which said photosensitive elements can be exposed.

23. The photographic film assemblage of claim 22 comprising a closure element located within said first envelope between said inner wall thereof and said photosensitive element of said first film unit in closing relation to said aperture, said leader means of said first film unit being folded so as to extend between said closure means and said photosensitive element of said first film unit and being attached to said closure element whereby withdrawal of said closure element from said first envelope is effective to cause said leader means of said first film unit to be withdrawn from said envelope so that it may be grasped for withdrawing said first film unit from said assemblage.

References Cited in the file of this patent

UNITED STATES PATENTS 2,669,168     Land  ---------------- Feb. 16, 1954

UNITED STATES PATENT OFFICE
CERTIFICATE OF CORRECTION

Patent No. 2,909,977                         October 27, 1959

William H. Eburn, Jr.

It is hereby certified that error appears in the above numbered patent requiring correction and that the said Letters Patent should read as corrected below.

Column 2, line 21, for "tthe" read -- the --; line 58, for "shalt" read -- salt --; column 4, line 74, for "particalarlly" read -- particularly --; column 5, line 6, for "connectiong" read -- connecting --; line 7, for "form" read -- from --; same column 5, line 15, for "faciltate" read -- facilitate --; column 6, line 15, for "enevolpe" read -- envelope --; column 7, line 68, after "located" insert -- together --; column 8, line 60, for "member" read -- members --; column 13, line 3, for "comprises" read -- comprise --.

Signed and sealed this 23rd day of January 1962.

(SEAL)
Attest:

ERNEST W. SWIDER                              DAVID L. LADD

Attesting Officer                          Commissioner of Patents